(12) United States Patent
Messana et al.

(10) Patent No.: US 10,689,504 B2
(45) Date of Patent: *Jun. 23, 2020

(54) TWO PART CURABLE COMPOSITION

(71) Applicant: Henkel IP & Holding GmbH, Duesseldorf (DE)

(72) Inventors: Andrew D. Messana, Newington, CT (US); Lynnette Hurlburt, Manchester, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,329

(22) Filed: Sep. 26, 2018

(65) Prior Publication Data

US 2019/0023872 A1  Jan. 24, 2019

Related U.S. Application Data

(63) Continuation of application No. PCT/US2017/020848, filed on Mar. 6, 2017.

(60) Provisional application No. 62/314,516, filed on Mar. 29, 2016.

(51) Int. Cl.
| | |
|---|---|
| C08F 2/00 | (2006.01) |
| C08G 85/00 | (2006.01) |
| C08G 61/04 | (2006.01) |
| C08K 5/3437 | (2006.01) |
| C08K 5/3417 | (2006.01) |
| C09D 4/00 | (2006.01) |
| C08F 220/14 | (2006.01) |
| C09J 4/00 | (2006.01) |
| C08F 220/18 | (2006.01) |
| C08K 5/18 | (2006.01) |
| C08K 5/315 | (2006.01) |

(52) U.S. Cl.
CPC .......... *C08K 5/3437* (2013.01); *C08F 220/14* (2013.01); *C08F 220/18* (2013.01); *C08K 5/18* (2013.01); *C08K 5/315* (2013.01); *C08K 5/3417* (2013.01); *C09D 4/00* (2013.01); *C09J 4/00* (2013.01)

(58) Field of Classification Search
CPC ...... C08K 5/3437; C08K 5/18; C08K 5/3417; C08K 5/315; C08F 220/18; C09D 4/00
USPC .................. 526/204, 89, 72; 520/1
See application file for complete search history.

(56) References Cited

U.S. PATENT DOCUMENTS

| | | |
|---|---|---|
| 1,581,361 A | 4/1926 | Smith |
| 3,740,850 A | 6/1973 | Bowen et al. |
| 4,284,551 A | 8/1981 | Argentar |
| 4,439,380 A | 3/1984 | Michl et al. |
| 4,536,546 A | 8/1985 | Briggs |
| 5,605,999 A | 2/1997 | Chu et al. |
| 6,391,993 B1 | 5/2002 | Attarwala et al. |
| 6,512,043 B2 * | 1/2003 | Wang ..................... C09J 133/06 524/560 |
| 6,730,411 B1 | 5/2004 | Doe et al. |
| 6,897,277 B1 | 5/2005 | Klemarczyk et al. |
| 7,411,025 B1 | 8/2008 | Messana et al. |
| 7,638,195 B2 | 12/2009 | Lichtenhan et al. |
| 7,728,092 B1 | 6/2010 | Jacobine et al. |
| 7,776,963 B2 | 8/2010 | Wang et al. |
| 8,642,691 B2 | 2/2014 | Hergenrother et al. |
| 8,794,282 B2 | 8/2014 | Hergenrother et al. |
| 9,969,690 B2 * | 5/2018 | Klemarczyk ........ C07D 215/06 |
| 2005/0192364 A1 | 9/2005 | Lichtenhan et al. |
| 2010/0305282 A1 | 12/2010 | Lichtenhan et al. |
| 2012/0129994 A1 * | 5/2012 | Birkett ................ C08F 290/067 524/239 |
| 2014/0221544 A1 | 8/2014 | Lichtenhan et al. |
| 2014/0275413 A1 | 9/2014 | Dershem et al. |
| 2017/0174630 A1 * | 6/2017 | Klemarczyk ........ C07D 215/06 |

FOREIGN PATENT DOCUMENTS

| | | |
|---|---|---|
| WO | 2009011819 | 1/2009 |
| WO | 2010127055 | 11/2010 |
| WO | 2013111036 | 8/2013 |
| WO | 2014004315 | 1/2014 |

OTHER PUBLICATIONS

International Search Report issued in connection with International Patent Application No. PCT/US2017/020848 dated Jun. 29, 2017.
Blanc Vazquez et al.: "Role of amine activators on the curing parameters, properties and toxicity of acrylic bone cements", Polymer International, vol. 46, No. 3, pp. 241-250 (1998).

* cited by examiner

*Primary Examiner* — Jessica Whiteley
(74) *Attorney, Agent, or Firm* — Steven C. Bauman

(57) ABSTRACT

Two part curable compositions are provided, which include a cure accelerator defined with reference to compounds shown in structure I

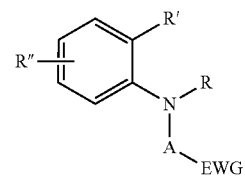

where A is $CH_2$ or benzyl, R is $C_{1-10}$ alkyl, R' is H or $C_{1-10}$ alkyl, or R and R' taken together may form a four to seven membered ring fused to the benzene ring, R" is optional, but when R" is present, R" is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl, and EWG is as shown, an electron withdrawing group, such as nitro, nitrile, carboxylate or trihaloalkyl.

7 Claims, 3 Drawing Sheets

TWO PART CURABLE COMPOSITION

BACKGROUND

Field

Two part curable compositions are provided, which include a cure accelerator defined with reference to compounds shown in structure I

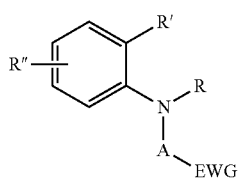

where A is $CH_2$ or benzyl, R is $C_{1-10}$ alkyl, R' is H or $C_{1-10}$ alkyl, or R and R' taken together may form a four to seven membered ring fused to the benzene ring, R" is optional, but when R" is present, R" is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl, and EWG is as shown, an electron withdrawing group, such as nitro, nitrile, carboxylate or trihaloalkyl.

BRIEF DESCRIPTION OF RELATED TECHNOLOGY

Two part curable adhesive compositions generally are well-known. See e.g. U.S. Pat. Nos. 7,776,963, 6,730,411, 6,512,043, 4,536,546, 7,638,195, 8,794,282, 8,642,691, and U.S. Patent Application Publication Nos. 2005/0192364, 2014/0221544 and 2010/0305282.

Notwithstanding the state of the art, there is an on-going desire to find alternative technologies for cure accelerators to differentiate existing products and provide supply assurances in the event of shortages or cessation of supply of raw materials. Moreover, since certain of the raw materials used as conventional curatives have to one degree or another come under regulatory scrutiny, alternative curatives would be desirable. Accordingly, it would be desirable to identify new materials for that function.

SUMMARY

Cure accelerators for two part curable compositions are provided herein as another option to satisfy that desire.

The compounds useful as cure accelerators for two part curable compositions are defined with reference to structure I:

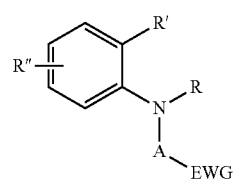

where A is $CH_2$ or benzyl, R is $C_{1-10}$ alkyl, R' is H or $C_{1-10}$ alkyl, or R and R' taken together may form a four to seven membered ring fused to the benzene ring, R" is optional, but when R" is present, R" is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl, and EWG is as shown, an electron withdrawing group, such as nitro, nitrile, carboxylate or trihaloalkyl.

Compounds within structure I may be prepared from the following starting material II:

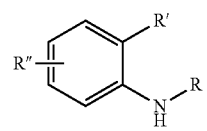

where R, R' and R" are as described above.

Compounds within structure I may be prepared in the general reaction scheme as follows:

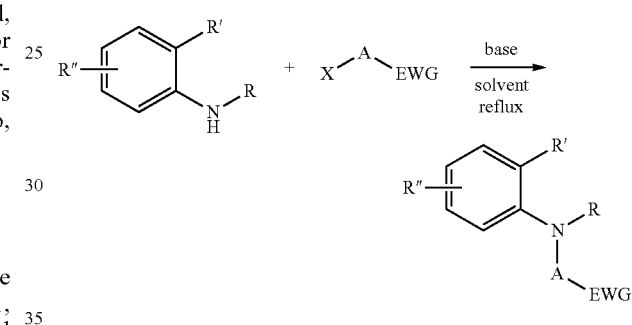

where A, R, R', R" and EWG are as described above.

More specifically, the reaction schemes may be represented as follows:

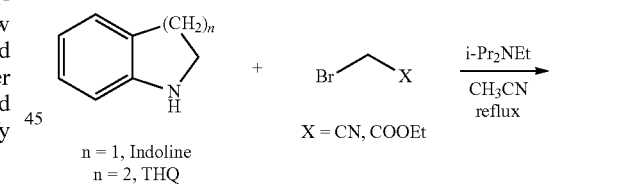

n = 1, Indoline
n = 2, THQ

X = CN, COOEt

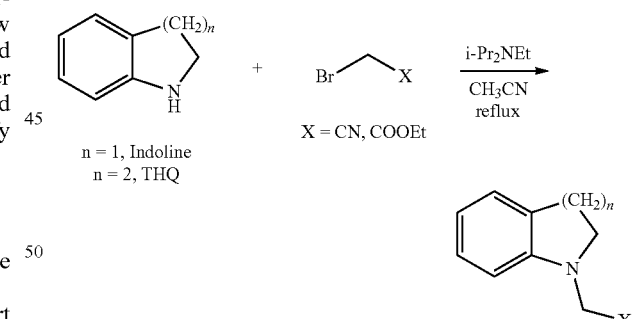

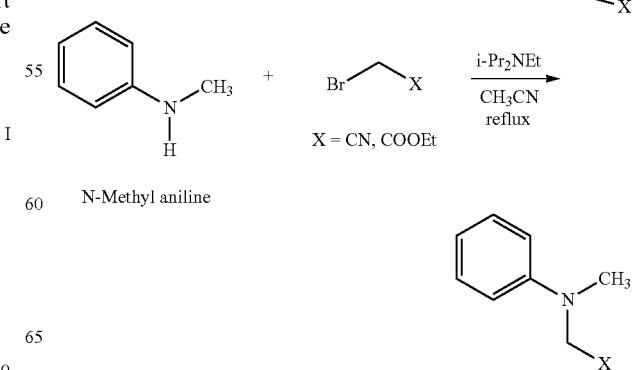

N-Methyl aniline

X = CN, COOEt

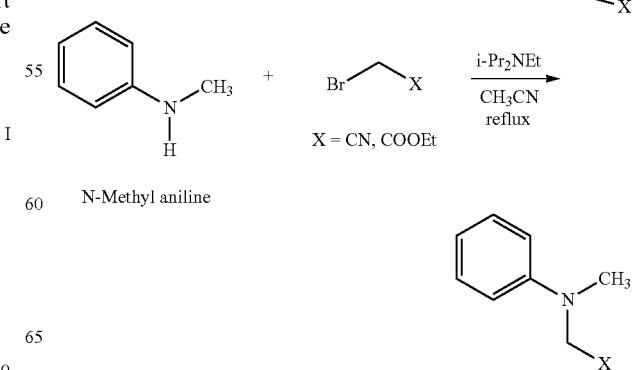

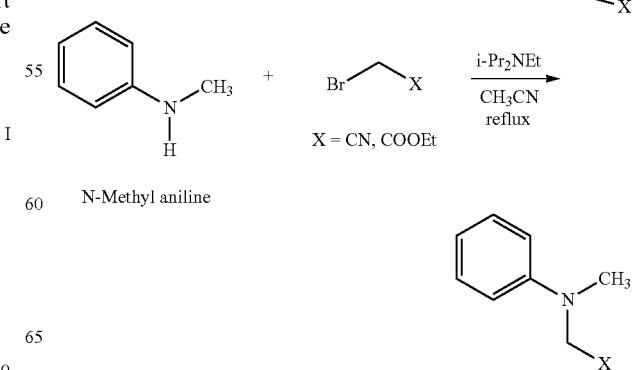

-continued

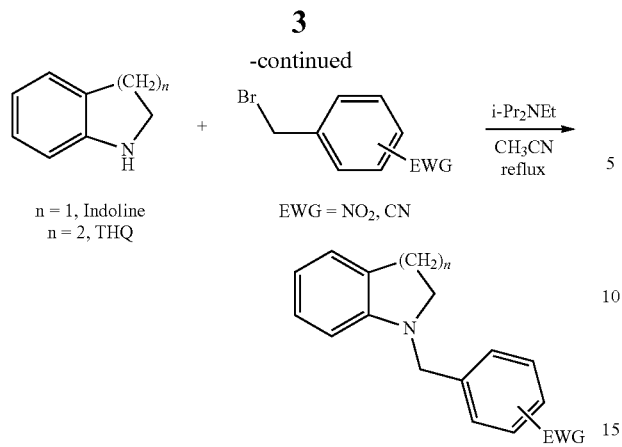

n = 1, Indoline
n = 2, THQ

EWG = NO₂, CN where n is 1 or 2 in the top scheme and X is a representative electron withdrawing group as shown. While an electron withdrawing group-containing alkyl (such as methyl) or benzyl bromide is shown as the reactant in this scheme, other halides and other leaving groups such as tosylate and mesylate, may be used as well.

Two part curable compositions are provided that use the inventive curative.

Methods of preparing and using two part curable compositions prepared with the inventive curative also are provided, as well are the reaction products of the curable compositions.

DETAILED DESCRIPTION

Figure 1:
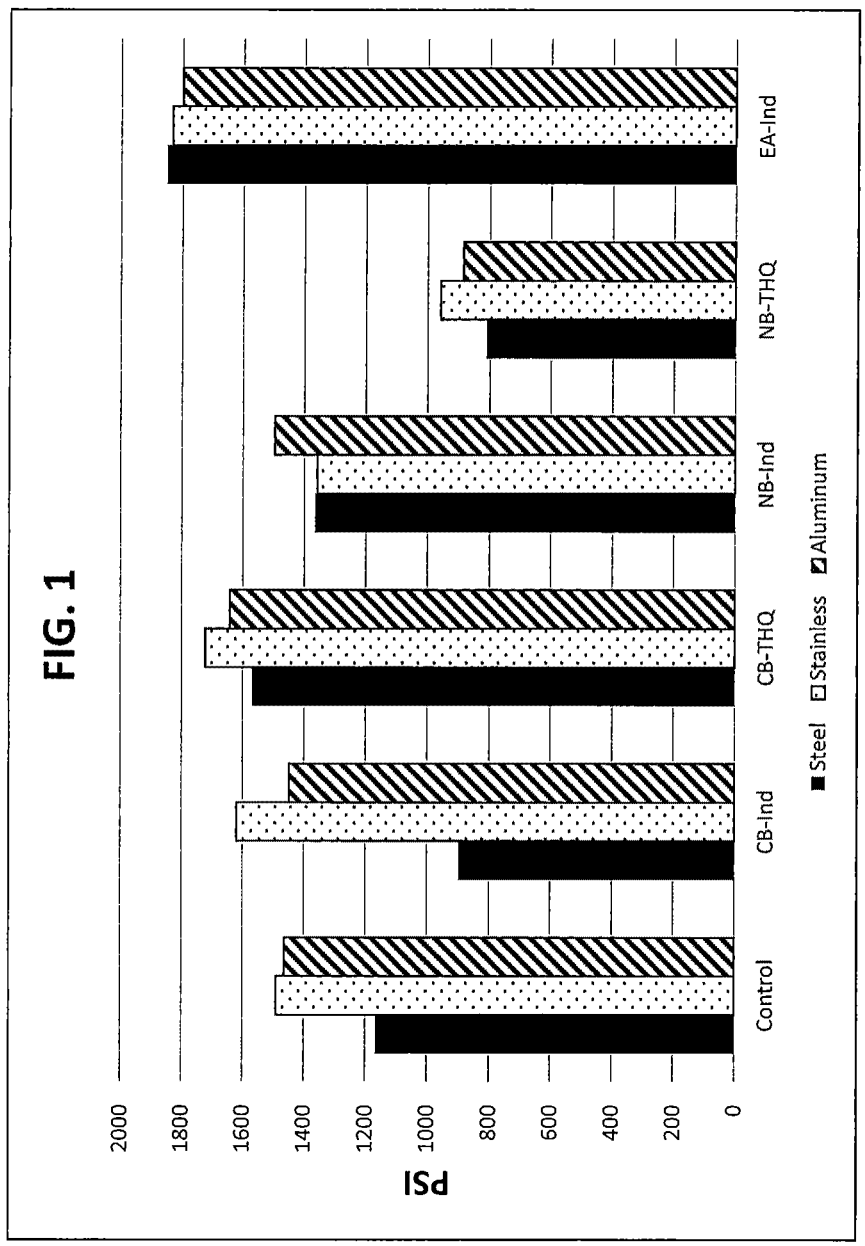
FIG. 1 depicts a bar chart of tensile shear strength performance of two part curable compositions using cure accelerators within the invention compared with a control on three different substrates.
Figure 2:
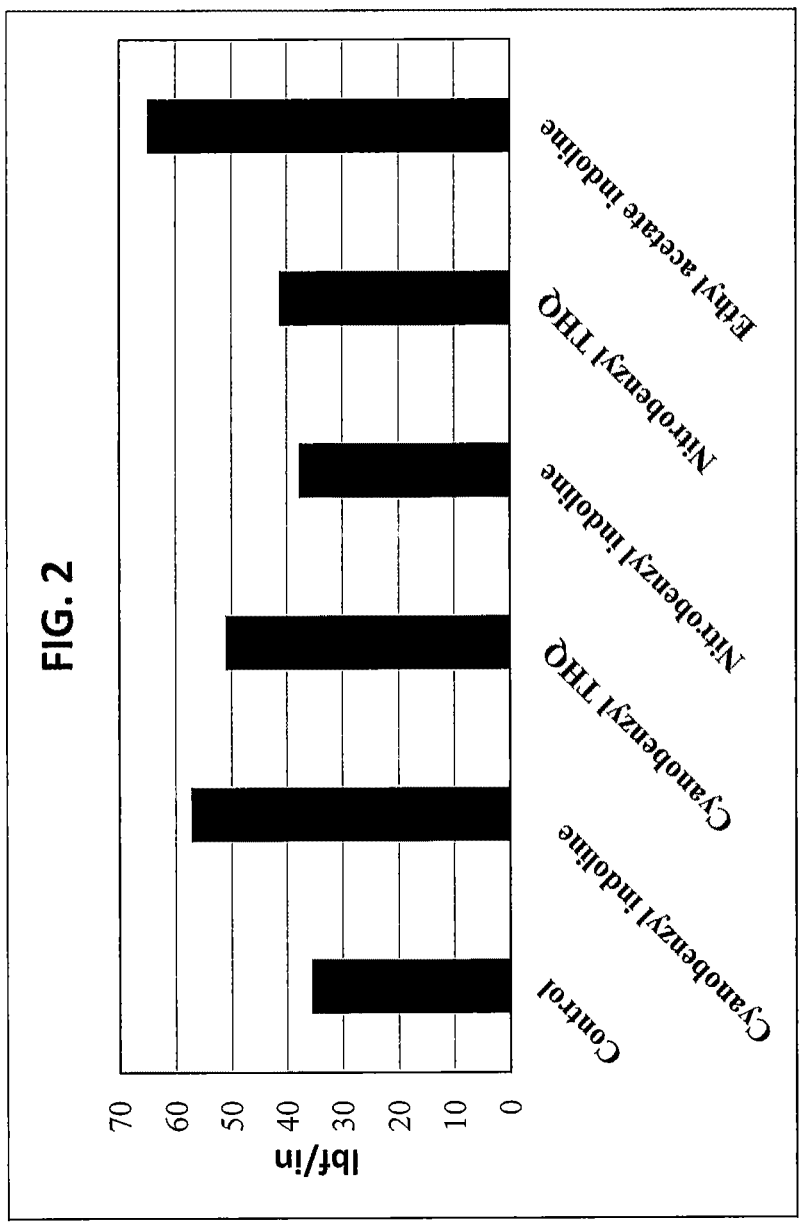
FIG. 2 depicts a bar chart of T peel strength performance of two part curable compositions using cure accelerators within the invention compared with a control on steel substrates.
Figure 3:
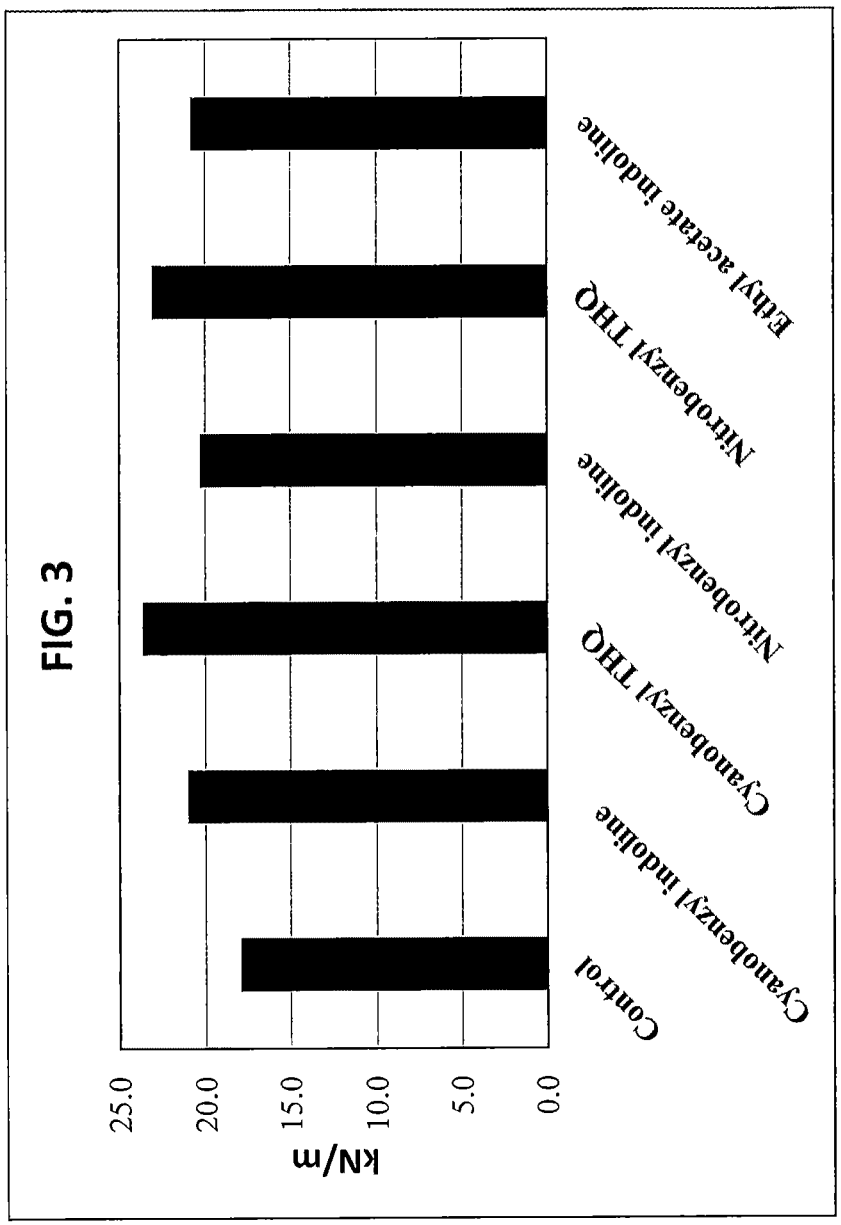
FIG. 3 depicts a bar chart of wedge impact strength performance of two part curable compositions using cure accelerators within the invention compared with a control on steel substrates.

As noted above, cure accelerators for two part compositions are provided, which are defined with reference to the compound shown in structure I

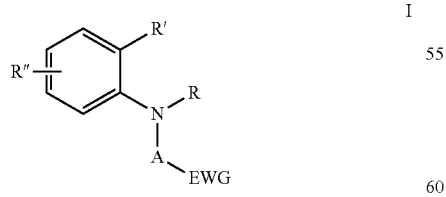

where A is $CH_2$ or benzyl, R is $C_{1-10}$ alkyl, R' is H or $C_{1-10}$ alkyl, or R and R' taken together may form a four to seven membered ring fused to the benzene ring, R" is optional, but when R" is present, R" is halogen, alkyl, alkenyl, cycloalkyl, hydroxyalkyl, hydroxyalkenyl, alkoxy, amino, alkylene- or alkenylene-ether, alkylene (meth)acrylate, carbonyl, car- boxyl, nitroso, sulfonate, hydroxyl or haloalkyl, and EWG is as shown, an electron withdrawing group, such as nitro, nitrile, carboxylate or trihaloalkyl.

Specific examples of compounds within structure I are:

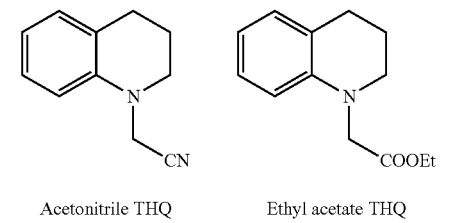

Acetonitrile THQ    Ethyl acetate THQ

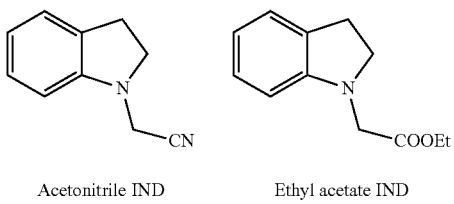

Acetonitrile IND    Ethyl acetate IND

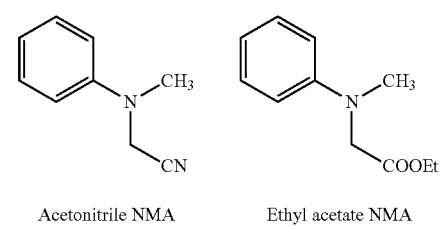

Acetonitrile NMA    Ethyl acetate NMA

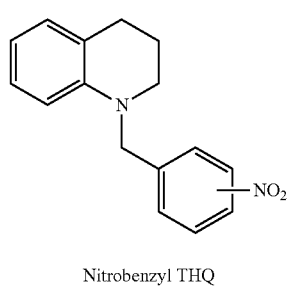

Nitrobenzyl THQ

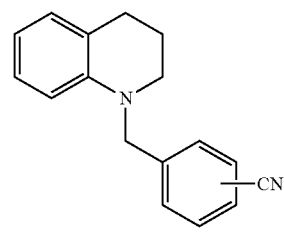

Cyanobenzyl THQ

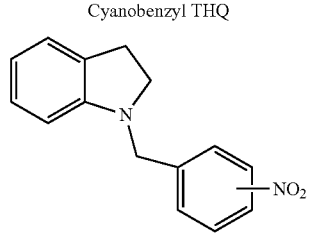

Nitrobenzyl IND

-continued

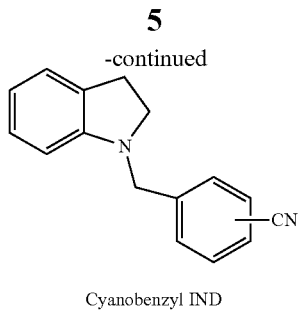

Cyanobenzyl IND

As noted above, compounds within structure I may be prepared from the following starting material II:

II where R, R', and R" are as described above.

Examples of these compounds within structure II include:

Tetrahydroquinoline (THQ)   Indoline (IND)   N-Methyl aniline (NMA)

Compounds within structure I may be thus prepared in the general reaction scheme as follows:

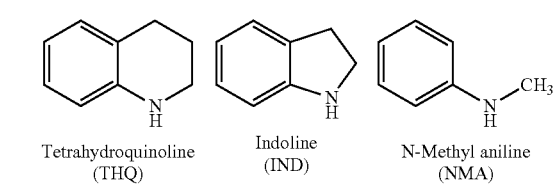

where A, R, R', R" and EWG are as described above, and X is leaving group, such as a halogen, desirably bromine, tosylate or mesylate.

More specifically, the reaction schemes may be represented as follows:

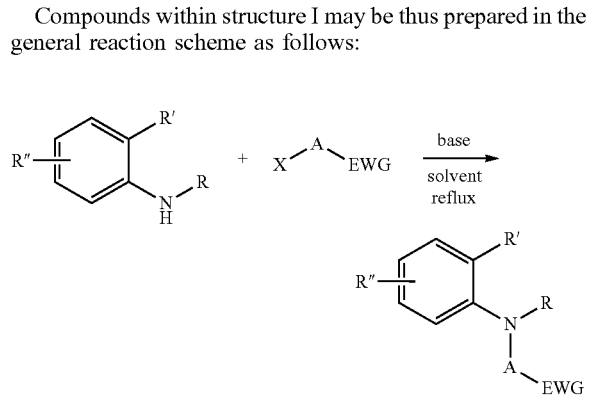

$n = 1$, Indoline
$n = 2$, THQ

X = CN, COOEt

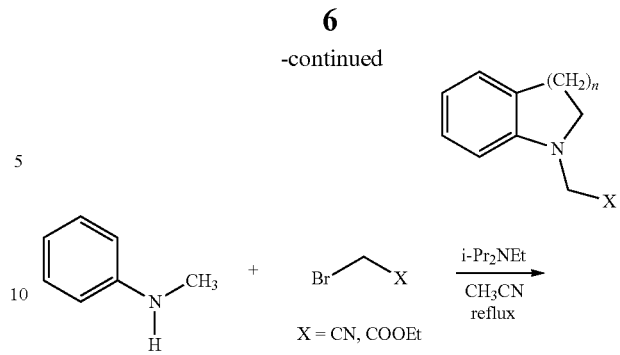

N-Methyl aniline $n = 1$, Indoline
$n = 2$, THQ

EWG = $NO_2$, CN where n is 1 or 2 in the top scheme and X is a representative electron withdrawing group as shown. While an electron withdrawing group-containing alkyl (such as methyl) or benzyl bromide is shown as the reactant in this scheme, other halides or other leaving groups such as tosylate or mesylate, may be used as well.

In preparing the compounds of structure I, the reaction may be conducted in the presence of a solvent, in which case the compounds of structure II may be dissolved in solvent prior to reaction with the alkyl halide, or vice versa.

The temperature employed in the reaction may also vary over a wide range. Where the components are combined in approximately chemical equivalent amounts or with one in slight excess over the other, useful temperatures may vary from room temperature or below, e.g., 10° C. to 15° C., up to and including temperatures of 100° C.

The so-formed compounds may be purified to remove impurities, such as reaction by-products or impurities that accompany the reactants. The compounds can be purified for example by distillation, filtration, stripping, chromatography, or recrystallization, such that the purified reaction product(s) are essentially free of impurities, or comprise less than about 1 weight percent of impurities.

The addition of such compounds as cure accelerators into two part curable compositions as a replacement for some or all of the amount of certain conventional cure accelerators (such as the toluidines, DE-p-T and DM-o-T), surprisingly develops ultimate adhesive properties, while are comparable to those observed from conventional two part curable compositions.

Here, at least reduced levels of toluidines (such as about 50% or less by weight of that which is used in conventional two part curable compositions, for instance less than about 10 weight percent, such as less than about 5 weight percent, and desirably less than about 1 weight percent), if not altogether free of added toluidines may be achieved using the inventive accelerators embraced by structure I.

(Meth)acrylate monomers suitable for use as the (meth) acrylate component in the present invention may be selected from a wide variety of materials, such as those represented by $H_2C=CGCO_2R^{10}$, where G may be hydrogen, halogen or alkyl groups having from 1 to about 4 carbon atoms, and $R^{10}$ may be selected from alkyl, cycloalkyl, alkenyl, cycloalkenyl, alkaryl, alkaryl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, for example di- or tri-functional (meth)acrylates such as polyethylene glycol di(meth)acrylates, tetrahydrofuran (meth) acrylates and di(meth)acrylates, hydroxypropyl (meth)acrylate ("HPMA"), hexanediol di(meth)acrylate, trimethylol propane tri(meth)acrylates ("TMPTMA"), diethylene glycol dimethacrylate, triethylene glycol dimethacrylates ("TRIEGMA"), tetraethylene glycol di(meth)acrylates, dipropylene glycol di(meth)acrylates, di-(pentamethylene glycol) di(meth)acrylates, tetraethylene diglycol di(meth) acrylates, diglycerol tetra(meth)acrylates, tetramethylene di(meth)acrylates, ethylene di(meth)acrylates, neopentyl glycol di(meth)acrylates, and bisphenol-A mono and di(meth)acrylates, such as ethoxylated bisphenol-A (meth)acrylate ("EBIPMA"), and bisphenol-F mono and di(meth)acrylates, such as ethoxylated bisphenol-A (meth)acrylate.

Still other (meth)acrylate monomers that may be used herein include silicone (meth)acrylate moieties ("SiMA"), such as those taught by and claimed in U.S. Pat. No. 5,605,999 (Chu), incorporated herein by reference.

Other suitable monomers include polyacrylate esters represented by the formula

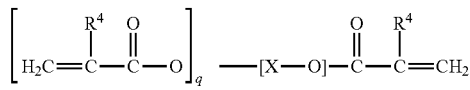

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably 30, and desirably about 20.

For example, X can be an organic radical of the formula:

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms.

Other classes of useful monomers are the reaction products of di- or tri-alkylolamines (e.g., ethanolamines or propanolamines) with acrylic acids, such as are disclosed in French Pat. No. 1,581,361.

Oligomers with (meth)acrylate functionality may also be used. Examples of useful (meth)acrylate-functionalized oligomers include those having the following general formula:

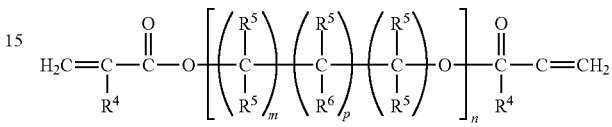

where $R^5$ represents a radical selected from hydrogen, lower alkyl of from 1 to about 4 carbon atoms, hydroxy alkyl of from 1 to about 4 carbon atoms, or

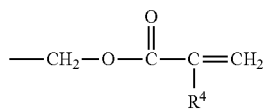

where $R^4$ is a radical selected from hydrogen, halogen, or lower alkyl of from 1 to about 4 carbon atoms; $R^6$ is a radical selected from hydrogen, hydroxyl, or

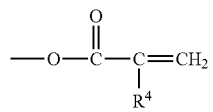

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably, the polar group is selected from labile hydrogen, heterocyclic ring, hydroxy, amino, cyano, and halo polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively. The so-formed (meth)acrylate urethane or urea esters may contain hydroxy or amino functional groups on the nonacrylate portion thereof. (Meth) acrylate esters suitable for use have the formula

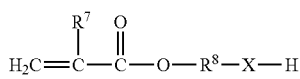

where X is selected from —O— and

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from lower alkylene of 1 through 8 carbon atoms, phenylene and naphthylene. These groups upon proper reaction with a polyisocyanate, yield a monomer of the following general formula:

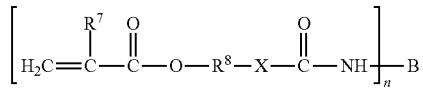

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 up to about 5,000) or in the polymer class (such as about greater than 5,000).

Of course, combinations of these (meth)acrylate monomers may also be used.

The (meth)acrylate component may comprise from about 10 to about 90 percent by weight of the composition, such as about 60 to about 90 percent by weight, based on the total weight of the composition.

Additional components have in the past been included in traditional curable compositions to alter the physical properties of either the formulation or the reaction products thereof. For instance, one or more of thermal resistance-conferring co-reactants (such as maleimide components), diluent components reactive at elevated temperature conditions, mono- or poly-hydroxyalkanes, polymeric plasticizers, thickeners, non-reactive plasticizers, fillers, toughening agents (such as elastomers and rubbers) and chelators (see U.S. Pat. No. 6,391,993, incorporated herein by reference) may be included to modify the physical property and/or cure profile of the formulation and/or the strength or temperature resistance of the cured adhesive.

When used, the co-reactant, reactive diluent, plasticizer, mono- or poly-hydroxyalkanes, filler and/or toughening agent may be present in an amount within the range of about 1 percent to about 30 percent by weight, based on the total weight of the composition.

The inventive compositions may also include other conventional components, such as free radical initiators, free radical co-accelerators, and inhibitors of free radical generation, as well as metal catalysts.

A number of oxidants may be used in the two part curable compositions including hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, t-amyl hydroperoxide, 1,2,3,4-tetramethylbutyl hydroperoxide and combinations thereof.

Such peroxides are typically employed in the present invention in the range of from about 0.1 to about 10 percent by weight, based on the total weight of the composition, with about 1 to about 5 percent by weight being desirable.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelating agents may ordinarily be present in the compositions in an amount from about 0.001 percent by weight to about 0.1 percent by weight, based on the total weight of the composition.

The inventive cure accelerators may be used in amounts of about 0.1 to about 5 percent by weight, such as about 1 to about 2 percent by weight, based on the total weight of the composition. When used in combination with conventional accelerators (though at lower levels than such conventional accelerators), the inventive accelerators should be used in amounts of about 0.01 to about 5 percent by weight, such as about 0.02 to about 2 percent by weight, based on the total weight of the composition.

The present invention also provides methods of preparing and using the inventive curable compositions, as well as reaction products of the compositions.

The compositions of the present invention may be prepared using conventional methods which are well known to those persons of skill in the art. For instance, the components of the inventive two part curable compositions may be mixed together in any convenient order in their respective parts consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. An appropriate primer for curable compositions may be applied to a surface of the chosen substrate to enhance cure rate. Or, the inventive cure accelerators may be applied to the surface of a substrate as a primer.

In addition, the invention provides a method of preparing a two part curable composition, a step of which includes mixing together a (meth)acrylate component, and the cure accelerator compound shown in structure I.

The invention also provides a process for preparing a reaction product from the two part curable composition of the present invention, the steps of which include applying the composition to at least one desired substrate surface and allowing the composition to cure. Here, if one substrate surface is provided a coating may form; if two substrate surfaces are provided and the composition is disposed therebetween an adhesive bond may form.

This invention also provides a method of using as a cure accelerator for two part curable compositions, compounds of structure I. That method involves providing a first part and a second part of a two curable composition in at least one of the parts is a (meth)acrylate component; providing a cure accelerator of structure I into the first part; mixing the first part and the second part and exposing the curable composition to conditions favorable to cure the composition.

And the present invention provides a method of using a cure accelerator compound, including (I) mixing the cure accelerator compound in (a) a curable composition or (b) a first part of a two part curable composition, or (II) applying onto a surface of a substrate the cure accelerator compound and applying thereover a curable composition. Of course, the present invention also provides a bond formed between mated substrates with the inventive composition.

In view of the above description of the present invention, it is clear that a wide range of practical opportunities are provided. The following examples are illustrative purposes only, and are not to be construed so as to limit in any way the teaching herein.

EXAMPLES

Synthesis

N-Ethyl Acetate Tetrahydroquinoline

To a 1000 mL four-neck round bottom flask, equipped with a condenser, thermocouple, stir bar, magnetic stirrer, and a nitrogen inlet, is added tetrahydroquinoline (50 g, 0.38 mol), ethyl bromoacetate (75.2 g, 0.45 mol), diisopropylethylamine (58.2 g, 0.45 mol), and acetonitrile (500 mL) with stirring. The solution was heated to reflux. The reaction was stirred at reflux for four hours. The reaction mixture was added to 500 mL each of $H_2O$ and i-$Pr_2O$ in a 2000 mL separatory funnel. The aqueous layer was removed, and the organic layer was washed three times with 500 mL each of $H_2O$. The organic layer was separated, dried ($MgSO_4$), and filtered. Solvent was removed under reduced pressure. The residue was distilled under vacuum. Crude Yield=77.5 g (94%); B.P. (° C.)=130-133/2.0 Torr. Five fractions were collected, and fractions 2-5 were combined as pure product. Distilled Yield=75.4 g (92%); $^1$H NMR ($CDCl_3$) δδ 6.95-7.05 (m, 2, Ar—H), 6.6 (t, 1, Ar—H), 6.4 (d, 1, Ar—H), 4.2 (q, 2, O—$CH_2$), 4.0 (s, 2, N—$CH_2$—COO), 3.4 (t, 2, N—$CH_2$), 2.8 (t, 2, Ar—$CH_2$), 2.0 (m, 2, $CH_2$), 1.3 (t, 3, $CH_3$); $^{13}$C NMR ($CDCl_3$) 171, 145, 129, 127, 123, 117, 110, 61, 53, 51, 28, 22, 14; IR (neat) 2931, 1745, 1729, 1601, 1499, 1329, 1179, 1022, 971, 742 cm$^{-1}$.

N-Acetonitrile Tetrahydroquinoline

The same procedure as above was used with tetrahydroquinoline (75 g, 0.44 mol), bromoacetonitrile (81.2 g, 0.68 mol), diisopropylethylamine (87.3 g, 0.68 mol), and acetonitrile (500 mL). Crude Yield=100 g; B.P. (° C.)=134-135/2.0 Torr. Five fractions were collected, and fractions 2-5 were combined as pure product. Distilled Yield=81.2 g (84%); $^1$H NMR ($CDCl_3$) δδ 7.1 (t, 1, Ar—H), 7.0 (d, 1, Ar—H), 6.7 (t, 1, Ar—H), 6.6 (d, 1, Ar—H), 4.0 (s, 2, N—$CH_2$—CN), 3.3 (t, 2, N—$CH_2$), 2.8 (t, 2, Ar—$CH_2$), 2.0 (m, 2, $CH_2$); $^{13}$C NMR ($CDCl_3$) 143, 129, 127, 125, 119, 116, 112, 50, 40, 27, 22; IR (neat) 2932, 2238 (CN), 1603, 1496, 1328, 1240, 1194, 861, 742, 713 cm$^{-1}$. The product crystallized on standing at ambient temperature.

N-Ethyl Acetate Indoline

The same procedure as above was used with indoline (50 g, 0.42 mol), ethyl bromoacetate (83.5 g, 0.50 mol), diisopropylethylamine (64.5 g, 0.50 mol), and acetonitrile (500 mL). Crude Yield=91.1 g; B.P. (° C.)=120-123/2.0 Torr. Five fractions were collected, and fractions 2-5 were combined as pure product. Distilled Yield=80.3 g (93%); $^1$H NMR ($CDCl_3$) δδ 7.0-7.1 (m, 2, Ar—H), 6.7 (t, 1, Ar—H), 6.4 (d, 1, Ar—H), 4.2 (q, 2, O—$CH_2$), 3.9 (s, 2, N—$CH_2$—COO), 3.5 (t, 2, N—$CH_2$), 3.0 (t, 2, Ar—$CH_2$), 1.3 (t, 3, $CH_3$); $^{13}$C NMR ($CDCl_3$) 170, 151, 129, 127, 124, 118, 107, 61, 54, 50, 28, 14; IR (neat) 2980, 1744, 1731, 1607, 1489, 1251, 1180, 1020, 742, 709 cm$^{-1}$.

N-Acetonitrile Indoline

The same procedure was used with indoline (50 g, 0.42 mol), bromoacetonitrile (60.0 g, 0.50 mol), diisopropylethylamine (64.5 g, 0.50 mol), and acetonitrile (500 mL). Crude Yield=69.9 g; B.P. (° C.)=125-130/2.0 Torr. Five fractions were collected, and fractions 3-5 were combined as pure product. Distilled Yield=55.5 g (83%); $^1$H NMR ($CDCl_3$) δδ 7.1 (m, 2, Ar—H), 6.8 (t, 1, Ar—H), 6.6 (d, 1, Ar—H), 4.0 (s, 2, N—$CH_2$—CN), 3.4 (t, 2, N—$CH_2$), 2.8 (t, 2, Ar—$CH_2$); $^{13}$C NMR ($CDCl_3$) 149, 130, 127, 124, 115, 108, 53, 37, 28; IR (neat) 2848, 2238 (CN), 1607, 1486, 1309, 1242, 1149, 870, 750, 719 cm$^{-1}$. The product crystallized on standing at ambient temperature.

N-Ethyl Acetate-N-Methyl-Aniline

The same procedure as above was used with N-methyl aniline (53.5 g, 0.50 mol), ethyl bromoacetate (100.2 g, 0.60 mol), diisopropylethylamine (77.4 g, 0.60 mol), and acetonitrile (500 mL). Crude Yield=102.7 g; B.P. (° C.)=99-101/1.0 Torr. Five fractions were collected, and fractions 3-5 were combined as pure product. Distilled Yield=76.9 g (80%); $^1$H NMR ($CDCl_3$) δδ 7.2 (t, 2, Ar—H), 6.8 (t, 1, Ar—H), 6.7 (d, 2, Ar—H), 4.2 (q, 2, O—$CH_2$), 4.0 (s, 2, N—$CH_2$—COO), 3.0 (s, 3, N—$CH_3$), 1.3 (t, 3, $CH_3$); $^{13}$C NMR ($CDCl_3$) 170, 149, 129, 112, 107, 61, 54, 39, 14; IR (neat) 2981, 1745, 1729, 1600, 1505, 1366, 1184, 1117, 1027, 945, 747, 689 cm$^{-1}$.

N-Acetonitrile-N-Methyl-Aniline

The same procedure as above was used with N-methyl aniline (30.2 g, 0.28 mol), bromoacetonitrile (40.7 g, 0.34 mol), diisopropylethylamine (43.7 g, 0.34 mol), and acetonitrile (500 mL). Crude Yield=58.1 g; B.P. (° C.)=98-99/2.0 Torr. Five fractions were collected, and fractions 3-5 were combined as pure product. Distilled Yield=28.8 g (57%): $^1$H NMR ($CDCl_3$) δδ 7.3 (t, 2, Ar—H), 6.9 (t, 1, Ar—H), 6.8 (d, 2, Ar—H), 4.1 (s, 2, N—$CH_2$—COO), 3.0 (s, 3, N—$CH_3$);

$^{13}$C NMR (CDCl$_3$) 147, 129, 120, 115, 114, 41, 39; IR (neat) 2819, 2238 (CN), 1599, 1500, 1335, 1245, 1117, 998, 924, 753, 690 cm$^{-1}$.

N-Nitrobenzyl Tetrahydroquinoline

To a 1000 mL four-neck round bottom flask, equipped with a condenser, thermocouple, stir bar, magnetic stirrer, and a nitrogen inlet, is added tetrahydroquinoline (25 g, 0.19 mol), nitrobenzyl bromide (40.6 g, 0.19 mol), diisopropyl-ethylamine (27.1 g, 0.21 mol), and acetonitrile (500 mL) with stirring. The solution was heated to reflux. The reaction was stirred at reflux for four hours. The reaction mixture was added to 500 mL each of H$_2$O and EtOAc in a 2000 mL separatory funnel. The aqueous layer was removed, and the organic layer was washed three times with 500 mL each of H$_2$O. The organic layer was separated, dried (MgSO$_4$), and filtered. Solvent was removed under reduced pressure. The product was isolated as a crystalline, orange solid. Yield=77.5 g (94%); M.P.=101° C.: $^1$H NMR (CDCl$_3$) δ 8.2 (d, 2, Ar—H), 7.4 (d, 2, Ar—H), 6.95-7.05 (m, 2, Ar—H), 6.6 (t, 1, Ar—H), 6.3 (d, 1, Ar—H), 4.5 (s, 2, N—CH$_2$—Ar), 3.4 (t, 2, N—CH$_2$), 2.8 (t, 2, Ar—CH$_2$), 2.0 (m, 2, CH$_2$): $^{13}$C NMR (CDCl$_3$) 147.2, 147.0, 145, 129, 127, 124, 122, 117, 111, 55, 50, 28, 22; IR (neat) 2944, 1597, 1505, 1339, 1329, 1107, 950, 857, 732 cm$^{-1}$.

N-Cyanobenzyl Tetrahydroquinoline

The same procedure as above was used with tetrahydroquinoline (18.3 g, 137 mmol), 4-cyanobenzyl bromide (25.0 g, 137 mmol), diisopropyl-ethylamine (18.1 g, 140 mmol), and acetonitrile (500 mL). Yield=32.4 g (quant.); M.P.=ca. 35° C.: $^1$H NMR (CDCl$_3$) δ 7.6 (Ar—H), 7.4 (d, 2, Ar—H), 7.0 (m, 2, Ar—H), 6.6 (t, 1, Ar—H), 6.3 (d, 1, Ar—H), 4.5 (s, 2, N—CH$_2$—Ar), 3.4 (t, 2, N—CH$_2$), 2.8 (t, 2, Ar—CH$_2$), 2.0 (m, 2, CH$_2$): $^{13}$C NMR (CDCl$_3$) 145, 132, 129, 127, 122, 125, 119, 117, 116, 114, 111, 110, 55, 50, 27, 22; IR (neat) 2838, 2225, 1601, 1504, 1438, 1307, 1155, 973, 811, 743, 711 cm$^{-1}$. The product crystallized on standing at ambient temperature.

N-Nitrobenzyl Indoline

The same procedure as above was used with indoline (25.0 g, 210 mmol), nitrobenzyl bromide (45.4 g, 210 mmol), diisopropyl-ethylamine (29.7 g, 230 mmol), and acetonitrile (500 mL). Yield=50.5 g (95%); M.P.=99° C.: $^1$H NMR (CDCl$_3$) δ 8.2 (d, 2, Ar—H), 7.5 (d, 2, Ar—H), 7.0-7.1 (m, 2, Ar—H), 6.7 (t, 1, Ar—H), 6.4 (d, 1, Ar—H), 4.3 (s, 2, N—CH$_2$—Ar), 3.4 (t, 2, N—CH$_2$), 3.0 (t, 2, Ar—CH$_2$): $^{13}$C NMR (CDCl$_3$) 151, 147, 146, 130, 128, 127, 124, 123, 118, 107, 54, 53, 28; IR (neat) 2836, 1597, 1509, 1488, 1339, 1235, 1105, 1020, 845, 737, 712 cm$^{-1}$.

N-Cyanobenzyl Indoline

The same procedure as above was used with indoline (16.3 g, 137 mmol), cyanobenzyl bromide (25.0 g, 137 mmol), diisopropyl-ethylamine (18.1 g, 140 mmol), and acetonitrile (500 mL). Yield=30.1 g (quant.); M.P.=ca. 35° C.: $^1$H NMR (CDCl$_3$) δ 7.6 (d, 2, Ar—H), 7.4 (d, 2, Ar—H), 7.0-7.1 (m, 2, Ar—H), 6.7 (t, 1, Ar—H), 6.4 (d, 1, Ar—H), 4.3 (s, 2, N—CH$_2$—Ar), 3.3 (t, 2, N—CH$_2$), 3.0 (t, 2, Ar—CH$_2$): $^{13}$C NMR (CDCl$_3$) 152, 144, 132, 130, 128, 127, 124, 119, 118, 111, 107, 54, 53, 29; IR (neat) 2835, 2220, 1604, 1485, 1377, 1236, 1146, 1022, 823, 747, 718 cm$^{-1}$.

Preparation of Two Part Curable Compositions

The following components listed in the table below were used to make two part curable compositions for evaluation. The Part A was used in a 10:1 by volume ratio to the Part B:

|  | Wt % |
|---|---|
| Part A | |
| Methylmethacrylate | 45.95 |
| Chelating Agent | 0.1 |
| Triphenylphosphine | 0.5 |
| Stabilizing Premix | 0.05 |
| Plastic Powder | 4.5 |
| Thermoplastic Elastomer | 22 |
| Elastomeric Polymer | 13 |
| Hydrocarbon Wax | 0.4 |
| Methacrylic Acid | 10 |
| Surfactant | 1 |
| Cure Accelerator | 1.5 |
| Fumed Silica | 1 |
| Part B | |
| Polyalkylene Polyol | 10 |
| Plasticizer | 20.4 |
| Benzoyl Peroxide | 37 |
| Epoxy | 21 |
| Colorant | 1 |
| Polyethylene Wax | 11.5 |

The Part A was varied based on the identity of the cure accelerator. Each is listed in the tables below.

Lap shear specimens constructed of steel and stainless steel were used to evaluate shear strength of the two part curable compositions made with a control accelerator and each of the accelerators listed above. For the evaluation, onto the specimens was dispensed each of the two part curable compositions and the specimens mated to form an assembly. The composition disposed between the mated specimens in the assembly was allowed to cure to form the assembly. ASTM D1002-05 was used to conduct the shear strength evaluation. The results are shown below in Table 1:

TABLE 1

| | | Substrate Construction (psi) | | |
|---|---|---|---|---|
| Sample No. | Accelerator | Steel | Stainless | Al |
| 1 | p-Tolyl diethanolamine | 1167 | 1491 | 1464 |
| 2 | Cyanobenzyl indoline | 898 | 1620 | 1449 |
| 3 | Cyanobenzyl THQ | 1570 | 1722 | 1642 |
| 4 | Nitrobenzyl indoline | 1364 | 1357 | 1497 |
| 5 | Nitrobenzyl THQ | 810 | 959 | 886 |
| 6 | Ethyl acetate indoline | 1850 | 1832 | 1799 |
| 7 | THQ-diol | 1584 | 1299 | 1504 |

In addition to shear strength, peel strength evaluations were conducted on those samples as well. The peel strength was measured by dispensing the two part curable composition onto a steel substrate and placing thereover in a spaced apart relationship another steel substrate. The two part curable compositions once dispensed were allowed to cure for a period of time of about 20 minutes at a temperature of about 80° C., followed by a 24 hour cure at room temperature. The mated assembly was then evaluated by peeling one of the substrates away from the other in a 180° direction and measuring the force required to separate the two steel substrates. ASTM D1876 was used to conduct the shear strength evaluation. The results are shown in Table 2 below:

TABLE 2

| Sample No. | Accelerator | lbf/in |
|---|---|---|
| 1 | Control | 35.6 |
| 2 | Cyanobenzyl indoline | 57.3 |
| 3 | Cyanobenzyl THQ | 51 |
| 4 | Nitrobenzyl indoline | 37.8 |
| 5 | Nitrobenzyl THQ | 41.3 |
| 6 | Ethyl acetate indoline | 64.9 |

Wedge impact evaluations were conducted on those samples as well. The results are shown in Table 3 below:

TABLE 3

| Sample No. | Accelerator | Avg. kN/m |
|---|---|---|
| 1 | Control | 17.9 |
| 2 | Cyanobenzyl indoline | 21.0 |
| 3 | Cyanobenzyl THQ | 23.7 |
| 4 | Nitrobenzyl indoline | 20.3 |
| 5 | Nitrobenzyl THQ | 23.1 |
| 6 | Ethyl acetate indoline | 20.8 |

This data indicates that formulations in accordance with this invention exhibited acceptable performance and in some cases superior performance than conventional cure accelerators.

What is claimed is:

1. A two part curable composition comprising:
Part A: one or more compounds selected from

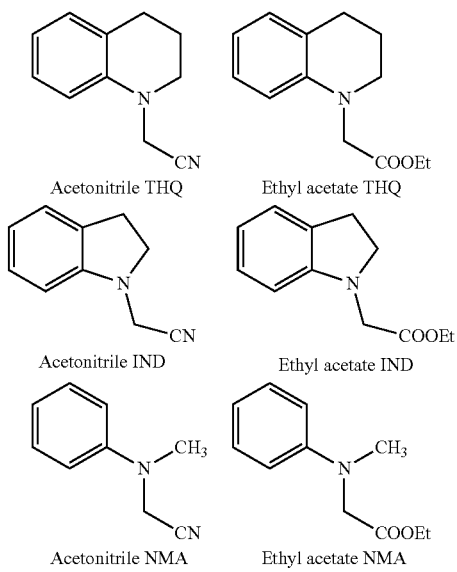

Acetonitrile THQ
Ethyl acetate THQ
Acetonitrile IND
Ethyl acetate IND
Acetonitrile NMA
Ethyl acetate NMA

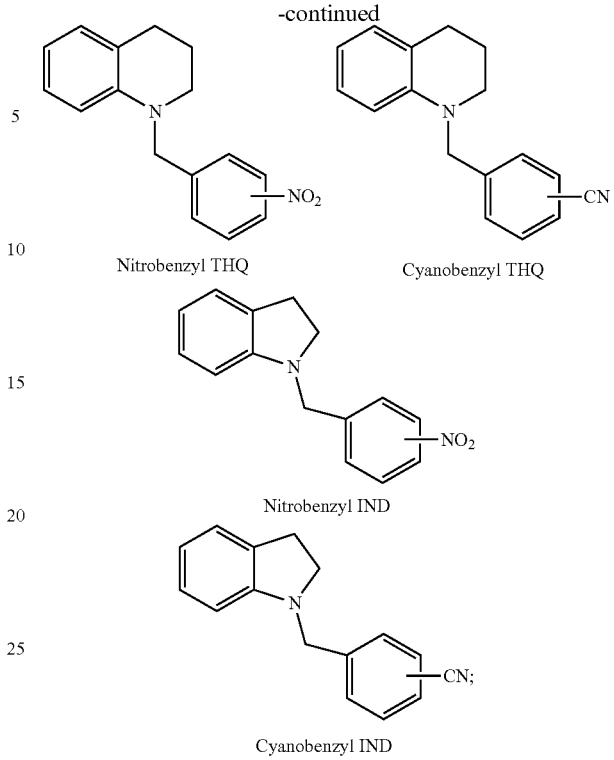

Nitrobenzyl THQ
Cyanobenzyl THQ
Nitrobenzyl IND
Cyanobenzyl IND and
Part B: an oxidant,
wherein at least one of Part A or Part B comprises a (meth)acrylate component.

2. A composition comprising a bond formed between two mated substrates with the composition of claim 1.

3. The composition of claim 1, wherein the (meth)acrylate component is with the general structure $H_2C=CGCO_2R^1$, wherein G may be hydrogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, and sulfone.

4. The composition of claim 1, wherein the (meth)acrylate component is selected from di- or tri-functional (meth)acrylates like polyethylene glycol di(meth)acrylates, tetrahydrofuran (meth)acrylates and di(meth)acrylates, hydroxypropyl (meth)acrylate, hexanediol di(meth)acrylate, trimethylol propane tri(meth)acrylate, diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, and bisphenol-F mono and di(meth)acrylates.

5. The composition of claim 1, wherein the oxidant is selected from cumene hydroperoxide, para-menthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis (t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

6. A method of using as a cure accelerator for two part curable compositions one or more compounds selected from

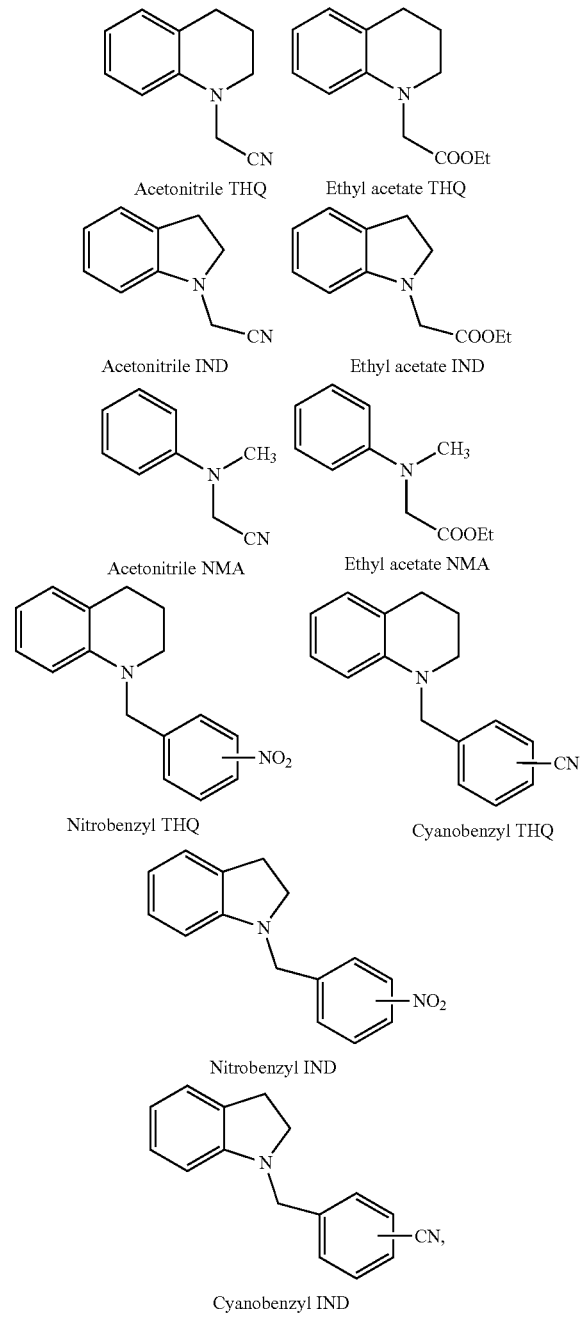

Acetonitrile THQ

Ethyl acetate THQ

Acetonitrile IND

Ethyl acetate IND

Acetonitrile NMA

Ethyl acetate NMA

Nitrobenzyl THQ

Cyanobenzyl THQ

Nitrobenzyl IND

Cyanobenzyl IND comprising the steps of:

(a) providing in a first part one or more of the compounds;

(b) providing in a second part an oxidant;

(c) providing in at least the first part or the second part a (meth)acrylate component; and (d) mixing the first part and the second part under conditions favorable to cure the composition.

7. A two part curable composition comprising:

Part A: one or more compounds within structure I below:

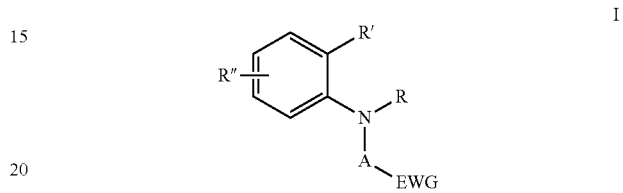

wherein A is $CH_2$ or benzyl, R is $C_{1-10}$ alkyl, R' is H or $C_{1-10}$ alkyl, or R and R' taken together may form a four to seven membered ring fused to the benzene ring, R" is optional, but when R" is present, R" is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl, and EWG is an electron withdrawing group; and Part B: an oxidant, wherein at least one of Part A or Part B comprises a (meth)acrylate component;

wherein the (meth)acrylate component is selected from di- or tri-functional (meth)acrylates like polyethylene glycol di(meth)acrylates, tetrahydrofuran (meth)acrylates and di(meth)acrylates, hydroxypropyl (meth)acrylate, hexanediol di(meth)acrylate, trimethylol propane tri(meth)acrylate, diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, and bisphenol-F mono and di(meth)acrylates; and wherein the oxidant is selected from cumene hydroperoxide, para-menthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

* * * * *